United States Patent [19]

Tausch

[11] 4,110,011
[45] Aug. 29, 1978

[54] PERISCOPE CONSTRUCTION

[75] Inventor: Gerald Tausch, Salem, Ohio

[73] Assignee: Miller-Holzwarth, Inc., Salem, Ohio

[21] Appl. No.: 770,641

[22] Filed: Feb. 22, 1977

[51] Int. Cl.² ............................................... G02B 5/08
[52] U.S. Cl. ..................................... 350/301; 350/287
[58] Field of Search ..................................... 350/21-24,
350/35, 48-53, 171-173, 286, 287, 301, 302

[56] References Cited

U.S. PATENT DOCUMENTS 2,591,752  4/1952  Wicklund ........................... 350/23 X

FOREIGN PATENT DOCUMENTS 1,493,192  7/1967  France ....................................... 350/23

Primary Examiner—F. L. Evans
Attorney, Agent, or Firm—Frease & Bishop

[57] ABSTRACT

A periscope has a pair of transparent, generally prismatic-shaped blocks which are mounted vertically with respect to each other within a protective housing that extends through an opening in an armored vehicle for safely viewing an exterior field of view from within the vehicle. The top block has an uppermost exterior field of view viewing surface and an adjacent reflector surface, with the bottom block having a bottommost interior observer viewing surface and an adjacent reflector surface, with the viewing surfaces being on diagonally opposite ends of the periscope. A beam splitter is mounted between the pair of blocks adjacent a second observer viewing surface which is formed on the bottom portion of the top block, located either exteriorly or interiorly of the armored vehicle. Exterior light beams entering through the exterior viewing surface are reflected downwardly through the block by the top reflector surface. A predetermined percentage of each of these reflected light beams is reflected by the beam splitter out of the second observer viewing window with the remaining unreflected portion of each light beam passing through said beam splitter and lower block. These unreflected light beam portions in turn are reflected out of the bottommost observer viewing window, thereby providing a pair of observer viewing windows in a periscope having a single exterior field of view viewing window.

7 Claims, 3 Drawing Figures

U.S. Patent    Aug. 29, 1978    4,110,011
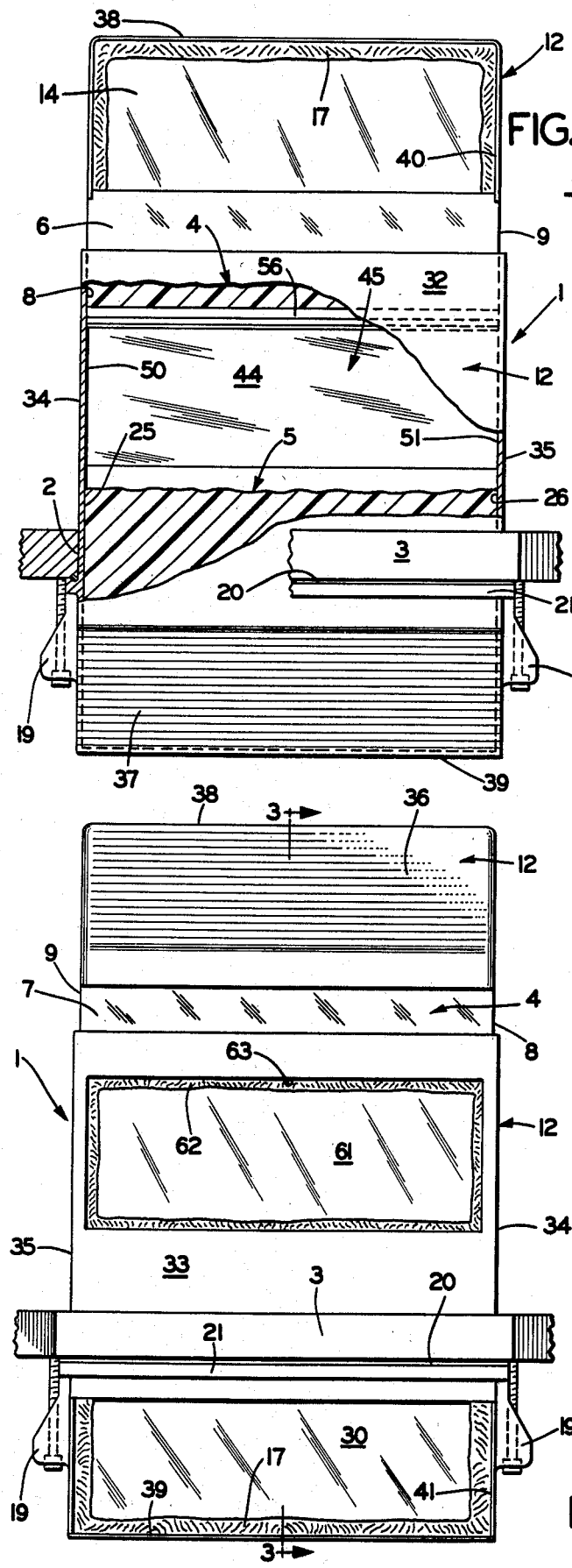
FIG.1
FIG.2
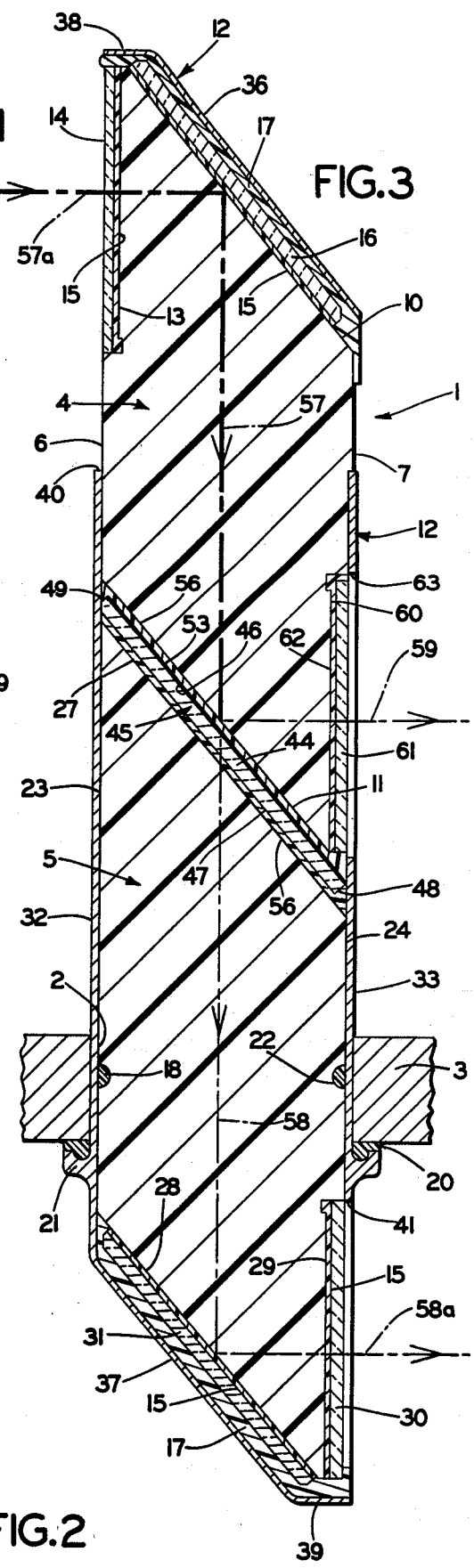
FIG.3

PERISCOPE CONSTRUCTION

BACKGROUND OF THE INVENTION

1. Field of the Invention

The invention relates to periscopes for observing an exterior field of view from within a protected structure, and particularly, to a periscope for armored vehicles. More particularly, the invention relates to a periscope having an optical system with a beam splitter in order to provide a pair of observer viewing windows with only a single external object viewing opening.

2. Description of the Prior Art

Numerous periscope constructions have been developed and are in use for armored vehicles such as tanks. These periscopes contain various optical systems which enable an occupant to observe a field of view exterior of the vehicle without providing a direct opening through the armor for passage of projectiles, chemicals, liquids, or other harmful materials. Many periscope constructions presently used on tanks consist of a single or a pair of solid plastic prismatic-shaped blocks mounted within a protected housing which extends through an opening in the tank. The tank occupant or observer views the exterior field of view through a single external viewing window opening and a single observer window opening located on diagonally opposite ends of the optical system housing.

It is desirable for some applications to have a pair of observer viewing windows or ports instead of the usual single observer opening for use by occupants of the protective structure or vehicle. The only know periscope constructions which have more than a single observer viewing opening use a movable mirror or mirrors for changing the direction of the light beams after they enter the optical system of the periscope. Any armor vehicle periscopes having movable parts such as mirrors, encounter serious problems in that the harsh environments to which they are subjected result in vibrations and distorted viewing to an observer and various maintenance problems. Likewise, manual manipulation is required for changing the viewing image between the pair of observer viewing windows. Also, only a single occupant can view the external field of view at one time and does not permit simultaneous viewing thereof by both occupants.

Therefore, the need has existed for a periscope construction for use in an armored vehicle which has at least a pair of observer viewing windows, at least one of which is located within the protected vehicle and which has only a single external field of view window opening; and in which the periscope is free of movable parts or other components which are subject to breakage and maintenance problems.

SUMMARY OF THE INVENTION

Objectives of the invention include providing a periscope construction for an armored vehicle having a pair of observer viewing windows for viewing an external field of view through a single external window opening without requiring manual manipulation of mirrors or other components within the periscope; providing a periscope construction in which the optical system includes a beam splitter mounted intermediate the pair of observer viewing windows whereby a predetermined portion of the light beams entering the periscope through the external viewing window is reflected by the beam splitter out of a first observer window with the remaining portion of the light beams passing through the beam splitter for subsequent reflection out of a second observer window; providing a periscope construction which enables an observer to selectively view an external field of view from either of the viewing ports, one of which may be located within the protected vehicle with the other observer window being located externally of the vehicle, or alternatively, enabling two separate observers to view the external field of view simultaneously through both observer windows; providing a periscope construction in which the optical system is free of any movable parts and is contained within a protective metal housing firmly mounted in an opening of an armored vehicle and consequently is relatively unaffected by vibrations, shocks and other stresses which it encounters in the harsh environment to which it is subjected; providing such a periscope construction in which the portions of the light beams which are reflected by and pass through the beam splitter may be varied for various applications in which the periscope is to be used by changing the coating of the beam splitter substrate; and providing an improved periscope construction which is of an extremely simple, rugged, effective and inexpensive construction which eliminates difficulties and solves problems and satisfies needs which have long existed in the art.

These objectives and advantages are obtained by the improved periscope construction of the type having protective housing means with at least front and rear walls, and an optical system mounted within the housing means, in which the optical system includes object viewing opening means formed in the housing means front wall; first reflective surface means mounted within the housing means adjacent the object viewing opening means for reflecting a beam of light entering said opening means into the interior of said housing means; first and second eyepiece viewing opening means formed in the housing means rear wall; beam splitting means mounted within the housing means adjacent the first eyepiece viewing opening means for reflecting a predetermined portion of a light beam reflected from the first reflective surface means out of the housing means through said first eyepiece viewing opening means, with a remaining unreflected portion of the light beam passing through said beam splitting means; and second reflective surface means mounted within the housing means for reflecting the portion of the light beam which passes through the beam splitting means out of the housing means through the second eyepiece viewing opening means.

BRIEF DESCRIPTION OF THE DRAWING

A preferred embodiment of the invention — illustrative of the best mode in which applicant has contemplated applying the principle — is set forth in the following description and shown in the accompanying drawing, and is particularly and distinctly pointed out and set forth in the appended claims.

FIG. 1 is a front elevational view of the improved periscope construction with portions broken away and in section, shown mounted on a portion of an armored vehicle;

FIG. 2 is a rear elevational view of the improved periscope construction of FIG. 1; and FIG. 3 is an enlarged vertical sectional view taken on line 3—3, FIG. 2.

Similar numerals refer to similar parts throughout the drawing.

DESCRIPTION OF THE PREFERRED EMBODIMENT

The improved periscope construction is indicated generally at 1, and is shown mounted within an opening 2 of a section of a vehicle armor plate 3. Periscope 1 includes a pair of transparent blocks 4 and 5 formed of clear plastic material of optical quality such as methyl methacrylate. Upper block 4 is located exteriorly of the armored vehicle with lower block 5 being located partially within the interior of the vehicle and partially exteriorly of the vehicle.

Upper block 4 preferably has a generally prismatic shape formed with opposed parallel front and rear planar surfaces 6 and 7 and a pair of opposed parallel planar end surfaces 8 and 9. Front and rear surfaces 6 and 7 are connected by an angled top surface 10 and a bottom planar surface 11. Surface 11 preferably is parallel with top surface 10 and forms a parallelogram in cross section with surfaces 6 and 7 as shown in FIG. 3. Front surface 6 is formed with a vertically extending recessed object viewing surface 13 having a transparent window glass 14 mounted thereon by a clear optical adhesive 15. A reflective mirror 16 is mounted on angled top surface 10 by optical adhesive 15 and forms an acute included angle with surface 13.

Block 4 is contained within a protective metal housing indicated generally at 12, and is secured therein by a sealing adhesive 17. Housing 12 is secured to armor plate 3 by a pair of end mounting lugs 19. A rectangular rubber sealing gasket 20 is mounted between armor plate 3 and a gasket receiving flange 21 for sealing housing 12 within armor plate opening 2.

Lower block 5 has a generally prismatic shape similar to block 4, and includes opposed parallel front and rear planar surfaces 23 and 24 and a pair of opposed planar end surfaces 25 and 26. A pair of parallel angled planar top and bottom surfaces 27 and 28 extend between surfaces 23-26 to complete the parallelogram cross-sectional shape of block 5.

Block 5 includes a vertically extending eyepiece viewing surface 29 at the bottom portion thereof having a transparent window glass 30 mounted thereon by optical adhesive 15. A mirror 31 is mounted on angled surface 28 by optical adhesive 15. Block 5 is mounted within housing 12 by sealing adhesive 17 in a similar manner as is upper block 4. In addition, a peripheral groove 22 is formed in block 5 which is filled with a sealing adhesive 18 for mounting block 5 within housing 12.

Housing 12 is formed by parallel front and rear walls 32 and 33, end walls 34 and 35, and angled top and bottom walls 36 and 37 which terminate in parallel end flange portions 38 and 39, respectively. An object viewing window opening 40 is formed in front wall 32 of housing 12 and aligns with object viewing surface 13 and window glass 14. A similar bottom eyepiece viewing window opening 41 is formed in rear wall 24 of housing 12 and aligns with eyepiece viewing surface 29 and window glass 30.

In accordance with one of the main features of the invention, a beam splitter, indicated generally at 45, is mounted between upper and lower blocks 4 and 5 as shown in FIG. 3. Splitter 45 is mounted between bottom surface 11 of block 4 and top surface 27 of block 5 by a clear optical adhesive 56. Splitter 45 preferably is positioned parallel with respect to top and bottom parallel mirrors 16 and 31.

Beam splitter 45 may be of the type produced and distributed by Evaporated Metal Films of Ithaca, New York and may have various transmission/reflection ratios depending upon the particular coating used thereon. Splitter 45 includes a substrate 44 which is a relatively thin plate formed of transparent glass. Substrate 44 preferably has a hexagonal configuration with parallel rectangular-shaped top and bottom surfaces 46 and 47, parallel end surfaces 48 and 49, and parallel side surfaces 50 and 51. Surfaces 46–51 are planar and join adjacent surfaces at right angles.

Top surface 46 of substrate 44 has a hard dielectric coating 53 of titanium dioxide providing a transmission/reflection ratio of 60/40. That is, 60% of each light beam 57a which enters the exterior object viewing window opening 40 and is reflected by mirror 16, passes through splitter 45, with the remaining 40% of incoming light beam 57a being reflected by splitter 45. The reflected portion of light beam 57a is shown by dot-dash line 59, and the transmitted portion is shown by dot-dash line 58. This 60/40 ratio may vary depending upon the particular application in which improved periscope 1 is to be used without affecting the concept of the invention.

A second recessed observer eyepiece viewing surface 60 is formed on the lower portion of rear planar surface 7 of upper block 4. A window glass 61 is bonded on surface 60 by clear optical adhesive 62. Surface 60 and window 61 are located adjacent an eyepiece viewing window opening 63 formed in rear housing wall 33.

In operation, light beams 57a from an exterior field of view, pass through window glass 14 and viewing surface 13 and are reflected downwardly through block 4 by mirror 16. Internal beam 57, upon striking the coated surface 53 of substrate 44, is partially reflected out of block 4 (dot-dash arrow 59) through viewing surface 60 and window glass 61. The remaining portion of beam 57 (indicated by dot-dash arrow 58) is transmitted through substrate 44 and passes through block 5 until striking mirror 31. Transmitted light beam portion 58 is then reflected through viewing surface 29 and window 30 (indicated by dot-dash arrow 58a) for viewing by a second observer.

Periscope 1 enables an occupant of an armored vehicle to safely view an exterior field of view by observation through lowermost viewing window 41 within armor plate 3, or if desired, to view the exterior field of view upon raising his head above armor plate 3 by observation at viewing window 63.

The longitudinal length of periscope 1 may be lengthened to provide a greater vertical separation between observer windows 63 and 41. This enables two occupants of a vehicle to view simultaneously the exterior field of view. Upper viewing window 63 may also be located below armor plate 3 or within a protected vehicle by merely providing a different mounting arrangement than shown in the drawing for periscope 1.

Although the above description indicates that 40% of light beam 57 is reflected through upper window 63, with the remaining 60% being reflected through bottm viewing window 41, these amounts will vary due to the reduction of the strength of the entering light beam 57a as it travels through the plastic material of blocks 4 and 5.

Accordingly, the improved periscope construction contains a beam splitter, firmly mounted and sealed between optical blocks 4 and 5 within the protective metal housing 12, and is free of any moving parts which are subject to maintenance problems or breakage and able to withstand the harsh environment to which periscope 1 is subjected; provides such a construction in which the beam splitter is a readily available, relatively inexpensive component which can be installed between blocks 4 and 5 with the same optical adhesive and by the same general manufacturing procedures that is used for installing window glasses 14 and 30, and which enables existing sizes and shapes of optical blocks 4 and 5 to be used, requiring only minor modifications thereto for forming recessed viewing surface 60 for receiving window glass 61; provides such a construction which eliminates any manual manipulation for viewing an external field of view through either observation window and in which no components project from the periscope surface to occupy space and become damaged; and provides such a construction which is of an extremely simple, rugged and inexpensive configuration, which eliminates difficulties encountered with prior devices, achieves the objectives indicated and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved periscope construction is constructed and used, the characteristics of the construction, and the advantageous, new and useful results obtained; the new and useful structures, devices, elements, arrangements, parts, and combinations, are set forth in the appended claims.

I claim:

1. A periscope construction of the type having a protective housing with at least front and rear walls, and an optical system mounted within the housing, in which the optical system includes:
   (a) a first block of optical material having an object viewing surface, a first reflective surface, a first eyepiece viewing surface, and a first end surface;
   (b) a second block of optical material having a second eyepiece viewing surface, a second reflective surface, and a second end surface;
   (c) the first and second blocks of optical material being mounted at and bonded to generally opposite ends of the protective housing and forming a parallelogram in cross section with the first and second reflective surfaces and the object and second eyepiece viewing surfaces, respectively, being generally parallel with respect to each other, and with the first and second end surfaces being spaced from each other and forming a void therebetween;
   (d) beam splitting means mounted within the void between the first and second end surfaces of the first and second blocks, with said beam splitting means reflecting a predetermined portion of a light beam entering the housing through the object viewing surface and reflected from the first reflective surface out of the housing means through the first eyepiece viewing surface, with a remaining unreflected portion of the light beam passing through said beam splitting means and being reflected from the second reflective surface out of the housing means through the second eyepiece viewing surface; and
   (e) optical adhesive means bonding the beam splitting means to the first and second end surfaces of the blocks to form an integrally joined compact optical system mounted within and bonded to the protective housing.

2. The periscope construction defined in claim 1 in which the first and second blocks are formed of plastic and have generally prismatic shapes; in which the beam splitting means is a generally flat rectangular-shaped beam splitter; and in which the beam splitter is located intermediate and generally parallel with the first and second reflective surfaces.

3. The periscope construction defined in claim 1 in which the beam splitting means reflects approximately 40% of each light beam which is reflected by said first reflective surface means out of the housing means through the first eyepiece viewing surface; and in which approximately 60% of each of said light beams passes through said beam splitting means and is reflected out of the housing means through the second eyepiece viewing surface.

4. The periscope construction defined in claim 1 in which the beam splitting means is formed of a transparent substrate having a hexagonal configuration; in which one of the surfaces of the substrate is coated with a hard dielectric; and in which the hard dielectric coating is titanium dioxide.

5. A periscope construction adapted to be mounted on an armor vehicle including:
   (a) a protective housing having at least front and rear walls;
   (b) an object viewing opening formed in the housing front wall, and vertically spaced first and second eyepiece viewing openings formed in the housing rear wall;
   (c) a first solid block of transparent optical material mounted within and secured to the housing having an object viewing surface aligned with the object viewing opening, a reflective surface forming an acute included angle with said object viewing surface, and a first eyepiece viewing surface aligned with the first eyepiece viewing opening, said first eyepiece viewing surface being generally diagonally opposite of the object viewing surface;
   (d) a second solid block of transparent optical material mounted within and secured to the housing and spaced from the first block, said second block having a second eyepiece viewing surface aligned with the second eyepiece viewing opening and a second reflective surface forming an included acute angle with said second eyepiece viewing surface;
   (e) a beam splitter mounted between the spaced first and second blocks adjacent to the first eyepiece viewing surface; said beam splitter having a beam splitting surface forming an inclined acute angle with the first eyepiece viewing surface and reflecting a predetermined portion of a light beam entering the housing object viewing opening and reflected from the first reflective surface out of the housing first eyepiece viewing opening, with a remaining unreflected portion of the light beam passing through the beam splitter surface and being reflected from the second reflective surface out of the housing second eyepiece viewing opening; and (f) optical adhesive means bonding the beam splitter to the first and second optical blocks to form an integrally joined optical system mounted within and secured to the protective housing.

6. The periscope construction defined in claim 5 in which the acute angles formed between the object viewing surface and first reflective surface, and between the second eyepiece viewing surface and second reflective surface, are approximately 45° each.

7. The periscope construction defined in claim 5 in which the blocks of optical material are secured to the housing by an adhesive.

* * * * *

UNITED STATES PATENT AND TRADEMARK OFFICE
CERTIFICATE OF CORRECTION

PATENT NO. : 4,110,011
DATED : August 29, 1978
INVENTOR(S) : Gerald Tausch

It is certified that error appears in the above—identified patent and that said Letters Patent are hereby corrected as shown below:

Column 4, Line 62  -  change "bottm" to -bottom-

Column 6, Line 61  -  change "inclined" to -included-

Signed and Sealed this

Thirteenth Day of February 1979

[SEAL]

*Attest:*

RUTH C. MASON
*Attesting Officer*

DONALD W. BANNER
*Commissioner of Patents and Trademarks*